US008239719B2

(12) United States Patent
Shen et al.

(10) Patent No.: US 8,239,719 B2
(45) Date of Patent: Aug. 7, 2012

(54) METHOD AND APPARATUS FOR HYBRID AUTOMATIC REPEAT REQUEST

(75) Inventors: Gang Shen, Shanghai (CN); Jimin Liu, Shanghai (CN); Jin Shan, Shanghai (CN); Wei Ni, Shanghai (CN); Wei Zou, Shanghai (CN)

(73) Assignee: Alcatel Lucent, Paris (FR)

( * ) Notice: Subject to any disclaimer, the term of this patent is extended or adjusted under 35 U.S.C. 154(b) by 700 days.

(21) Appl. No.: 12/374,754

(22) PCT Filed: Aug. 27, 2007

(86) PCT No.: PCT/CN2007/002578
§ 371 (c)(1),
(2), (4) Date: Jan. 22, 2009

(87) PCT Pub. No.: WO2008/034335
PCT Pub. Date: Mar. 27, 2008

(65) Prior Publication Data
US 2009/0313518 A1      Dec. 17, 2009

(30) Foreign Application Priority Data
Sep. 20, 2006     (CN) .......................... 2006 1 0116270

(51) Int. Cl.
*H04L 1/18*       (2006.01)
*G08C 25/02*   (2006.01)

(52) U.S. Cl. ...................................................... 714/748

(58) Field of Classification Search .......... 714/748–751; 370/338
See application file for complete search history.

(56) References Cited

U.S. PATENT DOCUMENTS

| 7,987,409 | B2 | 7/2011 | Suh et al. |
| 2005/0232183 | A1 | 10/2005 | Sartori et al. |
| 2006/0233200 | A1 | 10/2006 | Fifield et al. |

FOREIGN PATENT DOCUMENTS

| CN | 1422032 A | 6/2003 |
| CN | 1823489 A | 8/2006 |
| CN | 101047431 A | 10/2007 |
| EP | 1681792 A1 | 7/2006 |
| WO | WO 2006/023771 A2 | 3/2006 |

OTHER PUBLICATIONS

Liu et al., An integrated Radio Resource allocation framework for enhanced uplink UTRA_FDD with fixed relay stations, 2005, 14th IST Mobile & Wireless eurasip.org, p. 1 to 5.*
Stanojev et al., Performance of multi-relay collaborative hybrid ARQ protocols over fading channels, Jul. 2006, IEEE Comm. Letters, vol. 10, No. 7, p. 522 to 524.*
International Search Report.

* cited by examiner

*Primary Examiner* — Shelly A Chase
(74) *Attorney, Agent, or Firm* — Fay Sharpe LLP

(57) ABSTRACT

The present invention provides two primary Hybrid Automatic Repeat reQuest (HARQ) mechanisms for a multi-hop network, i.e. an active Mobile Multi-hop Relaying (MMR) HARQ and a passive Mobile Multi-hop Relaying (MMR) HARQ. According to the solution of the present invention, there are provided a method and a device for HARQ retransmission in relay stations of a wireless communication network, wherein in HARQ retransmission, the HARQ procedure is implemented based on resource allocated by a base station; and a method and device for HARQ in a base station, characterized in that a HARQ procedure is implemented in-between one or more relay stations and a mobile station. With the methods of the present invention, the HARQ problems existing in a multi-hop network are overcome, the correction rate of data transmission is improved, while time delay for data transmission is reduced.

38 Claims, 10 Drawing Sheets

METHOD AND APPARATUS FOR HYBRID AUTOMATIC REPEAT REQUEST

FIELD OF THE INVENTION

The present invention relates to a wireless communication network, and in particular relates to a Hybrid Automatic Repeat reQuest (HARQ) technology for a multi-hop network in wireless communication.

BACKGROUND OF THE INVENTION

Hybrid Automatic Repeat reQuest (HARQ) is a mechanism to compensate the degradation of the received bit error ratio (BER) and frame error ration (FER) which results from fast fading and shadowing. Currently, two modes of HARQ are prevailing in IEEE 802.16e, 3GPP high speed packet access (HSPA) and 3GPP long-term evolution (LTE), i.e. chase combining and incremental redundancy (IR).

HARQ is a mature technology and widely implemented in traditional single-hop networks, such as 3GPP HSDPA/HSUPA. But in mobile multi-hop relaying networks, with introduction of relay stations (RS) into wireless network, new issues come out along with change of network topology structure. Firstly, from the perspective of propagation, distinct wireless environments potentially result in great differences in the HARQ retransmission performances within multiple hops, which would cause incompatibility of the transmission rates of different hops, and as a result the throughput of the relay terminal is sure to decrease. Secondly, the physical layer resources can be drained due to the assignment for both accessing and relaying. Thirdly, extra delay may be caused by HARQ retransmissions within multiple hops, especially in the systems differentiating terminals with time-slots in a frame. Thus, the above problems need to be considered in the HARQ retransmission procedure designed for a mobile multi-hop relaying network, and a corresponding mechanism should be employed to avoid occurrence of problems or at least lower the occurrence probability of system performance degradation potentially caused by such problems.

On the other side, it is generally believed that relay stations (RS) are limited in processing intelligence and shall have relatively simpler structures and lower costs. Thus, functions and the related complexity of relay stations (RS) should be taken into account when designing HARQ retransmission procedure for a mobile multi-hop relaying network.

Currently, there is no HARQ mechanism suitable for a mobile multi-hop relaying network in the prior art. To improve the technical solution for a mobile multi-hop relaying network, it is urgent to provide a method and corresponding device for HARQ dedicated for a mobile multi-hop relaying network and taking the special issues of the above mobile multi-hop relaying network into account.

SUMMARY OF THE INVENTION

With respective to the above technical problems, the present invention provides a Hybrid Automatic Repeat reQuest (HARQ) mechanism for a multi-hop network.

According to a first aspect of the present invention, there is provided a method for HARQ in a relay station (RS) of a wireless communication network, wherein the HARQ procedure is implemented based on resources allocated by a base station (BS).

According to a second aspect of the present invention, there is provided a device for HARQ in a relay station (RS) of a wireless communication network, wherein the device implements the HARQ retransmission procedure based on resources allocated by a base station (BS).

According to a third aspect of the present invention, there is provided a method for HARQ retransmission in a base station (BS) of a wireless communication network, wherein the HARQ retransmission procedure is implemented in-between one or more RSs and a mobile station (MS) based on resources allocated by the BS.

According to a fourth aspect of the present invention, there is provided a device for HARQ in a base station (BS) of a wireless communication network, wherein the HARQ procedure is implemented in-between one or more RSs and a mobile station (MS) based on resources allocated by the BS.

The method according to the present invention overcomes the HARQ retransmission problems in a mobile multi-hop relaying network, improves the correction ratio of data transmission in the mobile multi-hop relaying network, and potentially reduces data transmission delay caused by introduction of relay stations (RSs).

BRIEF DESCRIPTION OF THE DRAWINGS

Other features, purposes and advantages of the present invention would be more apparent through reading the following detailed description of the non-limited embodiments with reference to the accompanying drawings, wherein.

DESCRIPTION OF THE PREFERRED EMBODIMENTS

Hereinafter, the embodiments of the present invention are described with reference to the accompanying drawings.

Figure 1A:
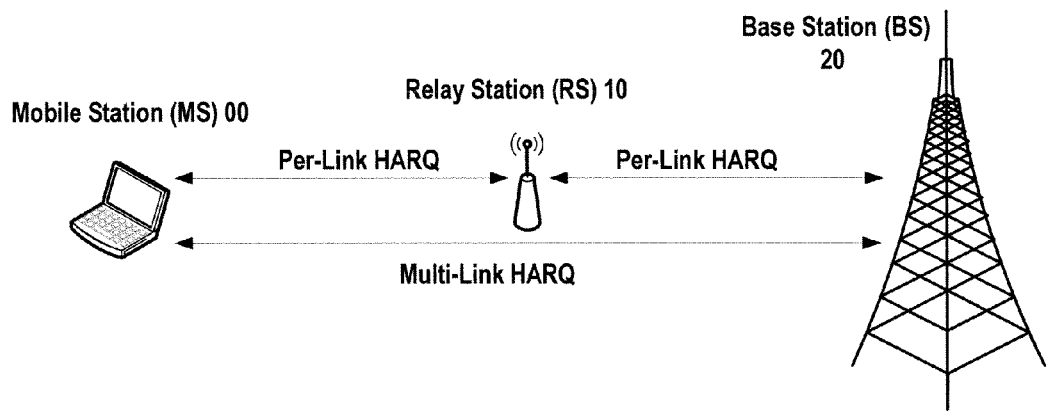
FIG. 1a is a diagram of a two-hop relaying network topological structure in a wireless communication network.
Figure 1B:
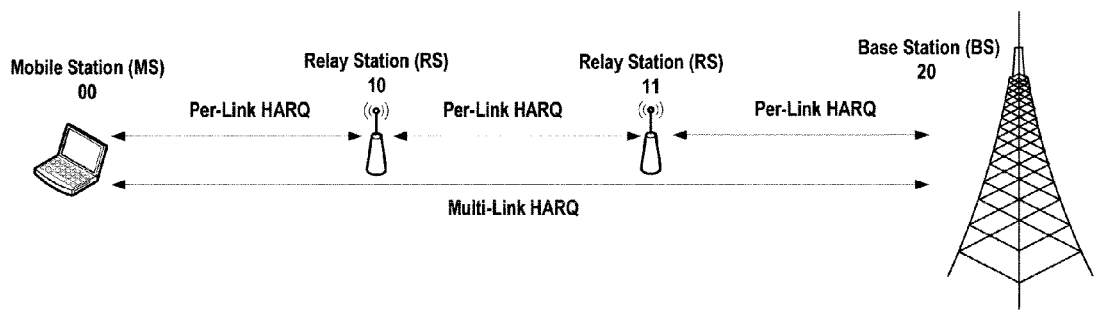
FIG. 1b is a diagram of a three-hop relaying network topological structure in a wireless communication network.

FIG. 1a and FIG. 1b are respectively diagrams of a two-hop relaying network topological structure and a three-hop relaying network topological structure in a wireless communication network, wherein the two-hop relaying network comprises a mobile station (MS) 00, a relay station (RS) 10 and a base station (BS) 20; while besides the MS 00, RS 10 and BS 20, the three-hop relaying network further includes another RS 11 disposed between the RS 10 and the BS 20. Though only two forms of mobile multi-hop relaying network are illustrated here, the skilled in the art would appreciate that the mobile multi-hop relaying network may further include other forms, for example, more RSs are utilized between the MS and the BS, as well as a combining relay, etc.

Just as mentioned in the Background of the Invention, distinct wireless environments potentially result in great differences in the HARQ performances within multiple hops, which would cause incompatibility of the transmission rates of different hops, for example the transmission rate of the hop between the MS 00 and the RS 10 and of the hop between RS 10 and the RS 11 as shown in FIG. 1a, or the transmission rates of the hop between the MS 00 and the RS 10 and of the hop between the RS 10 and the RS 11 as shown in FIG. 1b, and as a result the throughput of the MS 00 in FIGS. 1a and 1b, is sure to decrease. Thus, it needs to be determined whether the HARQ mechanism in the mobile multi-hop relaying network is suitable for a per-link HARQ or a multi-link HARQ, wherein the per-link HARQ is implemented within a single hop to compensate fast fading and shadowing in the single hop, while the multi-link HARQ is processing procedure at two ends of multiple hops and all retransmission resources are allocated by the two ends, as shown by corresponding arrows in FIG. 1a and FIG. 1b.

The solution of the present invention takes the simplicity and cost of the RS into account and expects that most retransmission coordination and resource allocation of the HARQ are performed at the BS, and in other words, the BS is responsible for most message feedback, as well as retransmission resource allocation and adjustment. Thus, in this aspect, the solution of multi-link HARQ is preferable. However, the per-link HARQ mechanism apparently has a flexibility to which the multi-link HARQ has no match. Consequently, the present invention provides a HARQ solution combining the advantages of both, i.e. no matter which message feedback mechanism (per-link or multi-link) is employed to schedule transmission state (transmission or retransmission) of each network element, it is always the BS to be in charge of resource allocation and adjustment of the HARQ.

It should be pointed out that the present invention mainly relates to a HARQ mechanism and implementation of the mechanism in the mobile multi-hop relaying network, thus it is unnecessary to take HARQ coding and combining technology into consideration. The technical solution of the present invention may support all HARQ coding and combining technologies, for example, soft combining and incremental redundancy, etc. Thus the specific coding and combining technology to be employed does not limit the present invention.

For the sake of a concrete description, the following notes are made, but they should be construed as only for the purpose of illustrating the preferred embodiments of the present invention, rather than as limitations to the technical solution of the present invention:

When a data packet is transmitted at the first time, verification of the data packet is a direct Cyclic Redundancy Check (CRC) on the data packet; while if the data packet is a retransmitted one, verification of the data packet is a CRC after combining the data packet with a previously received one;

The data packet passes the verification is a combined data packet;

a correct or incorrect verification result refers to passing or failing CRC; UL/DL MAP as shown in the figures refers to uplink/downlink control mapping information, i.e. information regarding BS-allocated resources.

Hereinafter, based on different message feedback manners, the embodiments of the above MMR HARQ mechanism according to the present invention are described in detail.

Embodiment 1

Active Mobile Multi-hop Relaying (MMR) HARQ

According to an embodiment of the present invention, the main characteristics of the active MMR HARQ is: after a RS receives a data packet from an immediately preceding hop device, it verifies whether the data packet is correct, and actively transmits the verification result to the immediately preceding hop device and to a BS for controlling resource allocation, wherein, if the data packet is transmitted for the first time, regardless of whether the data packet is correct, it is forwarded to the next hop device. If the data packet is a retransmission and the verification fails, it is not forwarded to the next hop device, and the verification result is reported to a BS, so as to request the BS to allocation resource to the immediately preceding hop device for retransmission. If the verification passes, the verified data packet is forwarded to the next hop device. The immediately preceding hop device and next hop device as mentioned here include a RS, a MS or a BS. Hereinafter, the procedure flow of the embodiment is described in detail with reference to FIG. 2 to FIG. 5.

Figure 2:
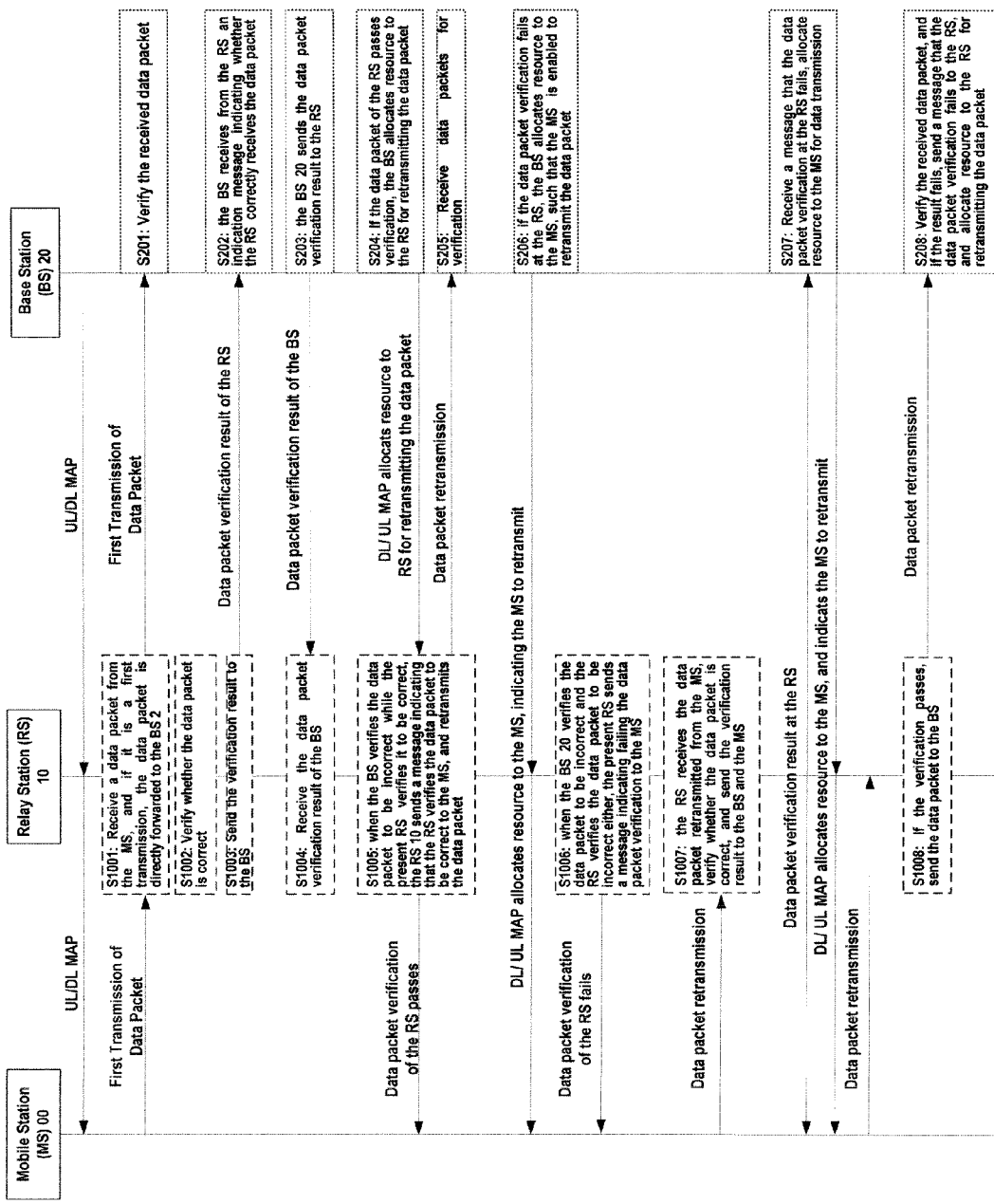
FIG. 2 is a flow diagram of an active Mobile Multi-hop Relaying (MMR) Hybrid Automatic Repeat reQuest (HARQ) method during uplink transmission of a data packet in a two-hop relaying network topological structure of a wireless communication network according to one embodiment of the present invention.

FIG. 2 is a flow diagram of an active MMR HARQ method during uplink transmission of data packet in a two-hop relaying network topological structure of a wireless communication network according to one embodiment of the present invention.

As shown in FIG. 2, when the data packet is transmitted for the first time:

At step S1001, based on the resource allocated by the BS 20, the RS 10 receives a data packet from the MS 00, and if it is a first transmission, the data packet is directly forwarded to the BS 20.

At step S1002, the RS 10 verifies the data packet, where since the data packet is firstly received, CRC verification is directly performed on the data packet.

At step S1003, based on the resource allocated by the BS 20, the RS 10 sends the verification result to the BS 20. In a specific implementation, the verification result may be sent to the BS 20 by being put along with the data packet into a specific message, which may also be sent in a separate way.

At step S201, the BS 20 receives a data packet from the RS 10 and verifies the data packet, where if the data packet is firstly received, CRC verification is directly performed on the data packet.

At step S202, the BS 20 receives an indication message from the RS 10, which indicates whether the RS 10 correctly receives the data packet.

At step S203, the BS 20 sends the verification result of the data packet to the RS.

If verification of the data packet passes at the BS 20, transmission of the data packet is completed. If verification of the data packet fails at the BS 20, the BS 20 will allocate resource to the RS 10 or MS 00 for retransmitting the data packet.

Retransmission of the RS 10:

At step S204, if the data packet verification fails at the BS 20 while according to the received indication message, the data packet passes verification at the RS 10, it indicates that the transmission of the data packet between the MS 00 and RS 10 is correct, while the transmission between the RS 10 and the BS 20 goes wrong. At this time, the BS 20 allocates resource to the RS 10 so as to enable the RS 10 to retransmit the data packet.

At step S1005, when the BS 20 verifies the data packet to be incorrect while the RS 10 verifies it to be correct, the RS 10 sends, based on the resource allocated by the BS 20, an indication message indicating that the RS 10 verifies the data packet to be correct to the MS 00. And then the RS 10 retransmits, based on the resource allocated by the BS 20, the data packet to the BS 20.

Here, it should be noted that at this time, since the RS 10 correctly receives the data packet, the MS 00 needs no retransmission, and the BS 20 may allocate some idle resources to the RS 10 such that RS 10 retransmits a plurality of said data packets simultaneously within the same frame (the plurality of data packets include identical effective data information, but the redundancy information may be different). In this way, long-time delay arising from relaying and retransmission may be reduced. After an uplink next hop device (it is the BS 20 in the example) of the RS combines the plurality of data packets, a combined data packet is obtained, and afterwards, an operation identical to that for receiving a single data packet is performed. Here, to simplify the MS processing, the above process is limited to the uplink transmission of data packet. If the MS is configured to support a plurality of data packets and combine them, the RS is also enabled to send the combined plurality of data packets to the downlink next hop device (it is the MS in the example) during downlink transmission of the data packet.

At step S205, the BS 20 receives one or more data packets for retransmission from the RS and verifies the data packets. Here, the verification refers to CRC on the combined data packet after combining the received one or more data packets with the received data packet at the first time. If the verification still fails, the step of retransmission at RS 10 is repeated till this data packet is correctly received, or transmission of this data packet is discarded when the retransmission times reaches the maximum value predetermined by the system.

Retransmission at the MB 00:

At step S206, if the verification fails at the RS, the BS 20 allocates resource to the MS 00, such that the MS 00 is enabled to retransmit the data packet based on the resource.

At step S1006, when both the BS 20 and the RS 10 verify the data packet to be incorrect, the RS 10 sends, based on the resource allocated by the BS 20, an indication message indicating that the RS 10 verifies the data packet to be incorrect to the MS 00.

After receiving the information from the RS 10 that the verification fails and the resource allocation information from the BS 20, the MS 00 retransmits the data packet to the RS 10.

At step S1007, the RS 10 receives the data packet retransmitted from the MS 00 and verifies whether the data packet is correct. The verification here is CRC performed after combining the previous received data packet. And the verification result is sent to the BS 20 and the MS 00.

At step S207, the BS 20 receives the verification result from the RS 10, and if the verification fails, resource is allocated for enabling the MS 00 to retransmit. Correspondingly, the RS 10 repeats the steps of S1006 and S1007.

At step S1008, if the RS 10 verifies that the data packet is correct, the combined data packet is directly sent to the BS 20.

At step S208, the BS 20 verifies the data packet. If the BS 20 receives correctly, the transmission of the data packet is completed; and if the BS 20 receives incorrectly, the above-mentioned retransmission procedure of the RS 10 is repeated, i.e. S1008, till the BS 20 receives correctly, or transmission of this data packet is discarded till the retransmission times reaches the maximum value pre-determined by the system.

Figure 3:
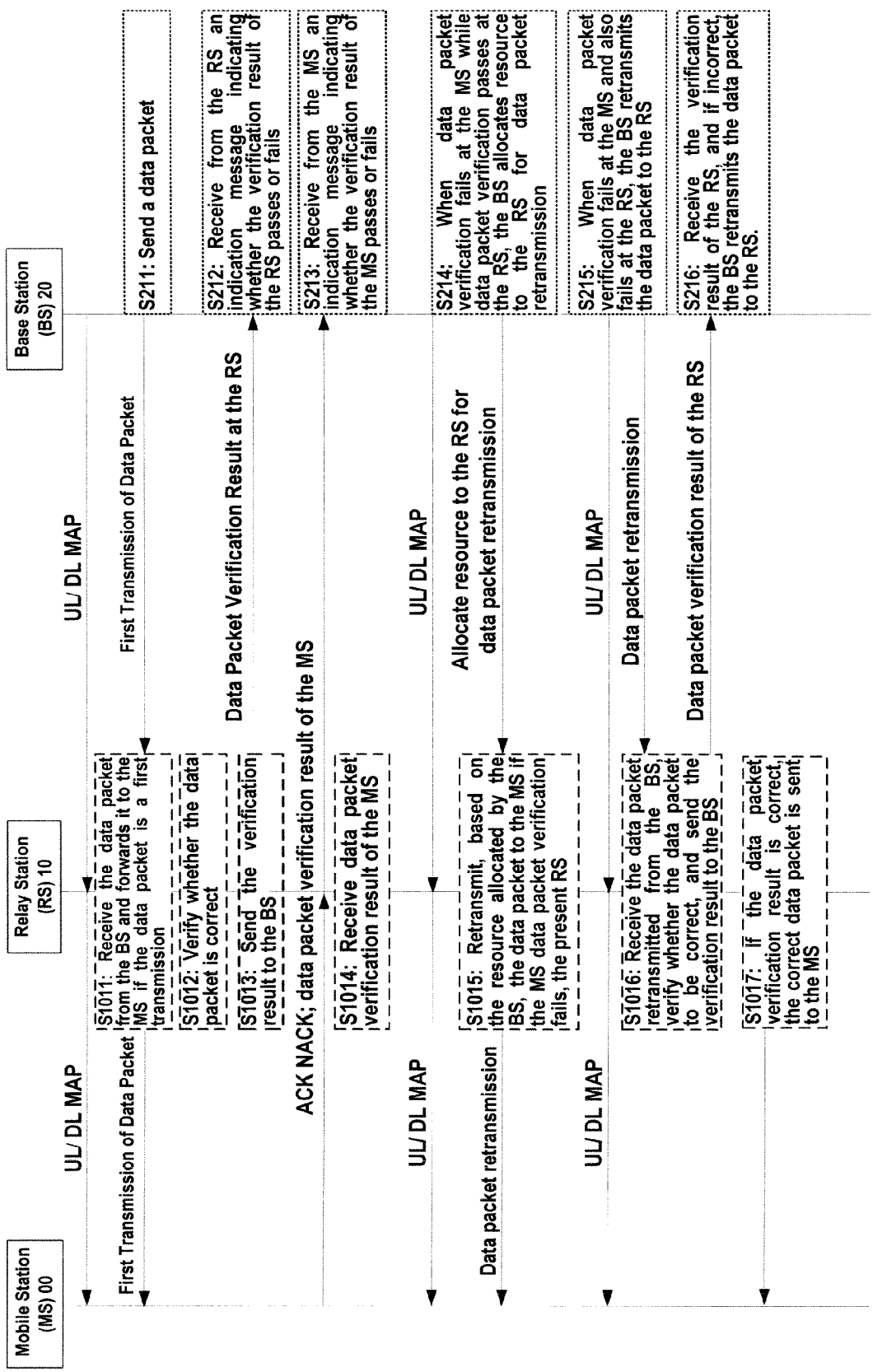
FIG. 3 is a flow diagram of an active Mobile Multi-hop Relaying (MMR) Hybrid Automatic Repeat reQuest (HARQ) method during downlink transmission of data packet in a two-hop relaying network topological structure of a wireless communication network according to one embodiment of the present invention.

FIG. 3 is a flow diagram of an active MMR HARQ method during downlink transmission of data packet in a two-hop relaying network topological structure of a wireless communication network according to one embodiment of the present invention.

As shown in FIG. 3, when the data packet is transmitted for the first time:

At step S211, the BS 20 sends a data packet to the RS 10.

At step S1011, the RS 10 receives the data packet from the BS 20 and forwards it to the MS 00.

At step S1012, the RS 10 verifies whether the data packet is correct.

At step S1013, the RS 10 sends the verification result of the data packet to the BS 20.

After the MS 00 receives the data packet from the RS 10, it verifies the data packet and sends the verification result to the BS 20 through the RS 10.

At step S1014, the RS 10 receives from the MS 00 an indication message indicating the data packet verification result of the MS 00.

At step S212, the BS 20 receives from the RS 10 an indication message indicating the data packet verification result of the RS 10, and meanwhile at step S213, receives from the MS 00 an indication message indicating the data packet verification result of the MS 00.

Retransmission of the RS:

When the indication message from the MS 00 indicates that the data packet verification fails at the MS 00 while the RS 10 verifies that the data packet is correct, at step S214, the BS 20 allocates resource to the RS 10 for data packet retransmission.

At step S1015, the RS 10, based on the resource allocated by the BS 20, retransmits the data packet to the MS 00 till the MS 00 correctly receives the data packet or the transmission of the data packet is discarded after the retransmission times reaches the maximum value predetermined by the system.

Retransmission of the BS 20:

When the indication message from the MS 00 indicates that MS 00 receives incorrectly the data packet while the data packet verification at the RS 10 also fails, at step S215, the BS 20 retransmits the data packet to the RS 10.

At step S1016, the RS 10 receives the data packet retransmitted from the BS 20, performs CRC after the data packet is combined with the data packet received at the first time, and sends the verification result to the BS 20.

If the data packet verification passes at step S1016, the RS 10 will send the combined data packet to the MS 00 at step S1017.

If the data packet is verified to be incorrect, the RS 10 does not forward the data packet to the MS 00, but waits for the BS 20 to retransmit the data packet.

At step S216, the BS 20 receives from the RS 10 an indication message indicating the data verification result of the RS 10, and if the indication message indicates that the verification fails, the BS 20 retransmits the data packet.

If the indication message indicates that the verification passes, the BS 20 waits for an indication message from the MS 00 that indicates the data packet verification result of the MS 00. If the MS 00 receives correctly, the data packet transmission is completed. If the MS 00 receives incorrectly, it means the transmission between the RS 10 and the MS 00 goes wrong, and the previously mentioned RS retransmission procedure should be repeated till the MS 00 correctly receives the data packet, or the data packet transmission shall be discarded after the retransmission times reaches the utmost value predetermined by the system.

Figure 4:
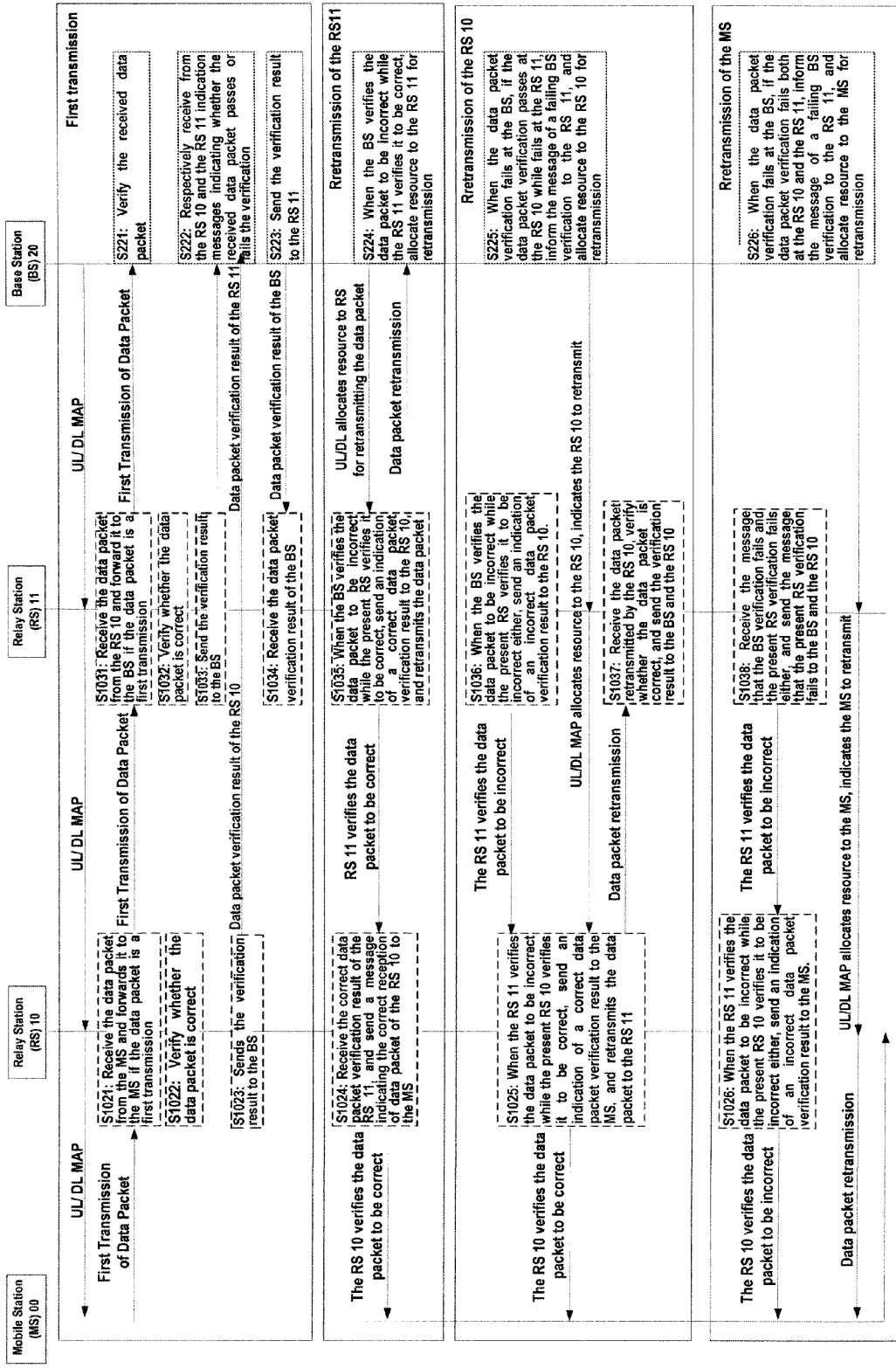
FIG. 4 is a flow diagram of an active Mobile Multi-hop Relaying (MMR) Hybrid Automatic Repeat reQuest (HARQ) method during uplink transmission of data packet in a three-hop relaying network topological structure of a wireless communication network according to one embodiment of the present invention.

FIG. 4 is a flow diagram of an active MMR HARQ method during uplink transmission of data packet in a three-hop relaying network topological structure of a wireless communication network according to one embodiment of the present invention.

As shown in FIG. 4, when the data packet is transmitted for the first time:

At step S1021, the RS 10 receives a data packet from the MS 00 and forwards it to the next hop device, i.e. the RS 11. At step S1022, the RS 10 verifies whether the data packet is correct. At step S1023, the verification result is sent to the BS 20.

At step S1031, the RS 11 receives the data packet from the RS 10 and forwards the data packet to the BS 20. At step S1032, the RS 11 verifies whether the data packet is correct. At step S1033, the verification result is sent to the BS 20.

At step S221, the BS 20 receives the data packet from the RS 11 and verifies the data packet. At step S222, indication messages indicating the data packet verification results from the RS 10 and the RS 11 are respectively received. At step S223, the BS 20 sends its indication message indicating the data packet verification result of step S221 to the RS 11.

At step S1034, the RS 11 receives from the BS 20 an indication message indicating the data packet verification result of the BS 20.

At this time, if the data packet of the BS 20 is verified correct, transmission of the data packet is complete.

If the data packet verification fails at the BS 20, the BS 20 determines to allocate resource to the RS 11 or the RS 10 or the MS 00, based on the data packet verification results of the RS 10 and the RS 11.

The BS 20 will allocate resource to the last RS where the data packet is verified correct in the transmission link. The skilled in the art would appreciate that in the data transmission link, as long as a data packet is verified correct at a RS, it is deemed that the data packet is correctly received, regardless of whether the data packet is correctly received at other RSs immediately preceding to the RS in the transmission link.

Retransmission of the RS 11:

When the data packet verification fails at the BS 20, while the verification passes at the RS 11 (regardless of whether the verification passes at the RS 10), at step S224, the BS 20 allocates resource to the RS 11 such that the RS 11 retransmits the data packet.

At step S1035, the RS 11, based on an indication message from the BS 20 indicating that the data packet verification fails at the BS and based on the successful data packet verification at the present RS, sends an indication message indicating that the RS 11 correctly receives the data packet to the RS 10. And meanwhile, the RS 11 retransmits, based on the resource allocated by the BS 20, the data packet to the BS 20, till the BS 20 correctly receives the data packet or the transmission of the data packet is discarded after the retransmission times reaches the maximum value predetermined by the system.

At step S1024, the RS 10 receives from the RS 11 an indication message that the RS 11 receives the data packet correctly, and then sends an indication message that indicates the data packet verification passes at the RS 10 to the MS 00, so as to inform the MS 00 of the successful transmission.

Here, it should be noted that at this time, since the RS 11 correctly receives the data packet, the RS 10 and the MS 00 need no retransmission, and the BS 20 may allocate some idle resources to the RS 11 such that the RS 11 retransmits a plurality of said data packets simultaneously within the same frame (the plurality of data packets include identical effective data information, but the redundancy information may be different). In this way, long-time delay arising from relaying and retransmission may be reduced. And then, the BS 20 combines the received plurality of data packets.

Retransmission of the RS 10:

When the data packet verification fails at the BS 20 and at the RS 11, but the data packet verification passes at the RS 10, at step S225, the BS 20 will allocate resource to the RS 10 such that the RS 10 retransmits the data packet.

At step S1036, the RS 11, based on an indication message from the BS 20 indicating that the data packet verification fails at the BS and based on the failing data packet verification at the present RS, sends an indication message indicating that the RS 11 incorrectly receives the data packet to the RS 10.

At step S1025, the RS 10 receives from the RS 11 an indication message indicating the failing data packet verification at the RS 11, and based on the correct data packet verification result at the present RS, sends an indication message indicating that the successful data packet verification at the present RS 10 to the MS 00 so as to inform the MS 00 about the successful transmission. And then, based on the resource allocated by the BS 20, the data packet is retransmitted to the immediately preceding hop device (i.e. RS 11).

Here, it should be noted that at this time, since the RS 10 correctly receives the data packet, the MS 00 needs no retransmission, and the BS 20 may allocate some idle resources to the RS 10 such that RS 10 retransmits a plurality of said data packets simultaneously within the same frame (the plurality of data packets include identical effective data information, but the redundancy information may be different). In this way, long-time delay arising from relay and retransmission may be reduced. After an uplink next hop device (it is a RS in the example) of the RS combines a plurality of received data packets, a combined data packet is obtained, and afterwards, an operation identical to that for receiving a single data packet is performed.

At step S1037, the RS 11 combines the received one or more data packets, then recombines them with the data packet which is received at the previous time, verifies the combined data, and then sends the verification result to the RS 10 and the BS 20.

If the data packet verification still fails at this time at the RS 11, the step of RS 10 retransmission is repeated likewise. If the verification passes, the RS 11 forwards the data packet to the BS 20. If the BS 20 receives correctly, the data packet transmission is completed. If the BS 20 receives incorrectly, the previous retransmission step of the RS 11 is repeated till the BS 20 correctly receives the data packet or the transmission of the data packet is discarded after the retransmission times reaches the maximum value predetermined by the system.

Retransmission at the MB 00:

When all the data packet verifications fail at the BS 20, the RS 10 and the RS 11, at step S226, the BS 20 allocates resource to the MS 00 such that the MS 00 retransmits the data packet.

At this time, At step S1038, the RS 11, like at the step S1036, based on an indication message from the BS 20 indicating that the data packet verification fails at the BS and based on the failing data packet verification result at the present RS, sends an indication message indicating that the RS 11 incorrectly receives the data packet to the RS 10.

At step S1026, the RS 10 receives from the RS 11 an indication message indicating that the data packet verification fails at the RS 11, and based on the failing data packet verification result at the present RS, sends an indication message indicating that the data packet verification fails at the present RS 10 to the MS 00.

The MS 00, in response to the indication message from the RS 10 indicating that the data packet verification fails at the RS 10 and based on the resource allocated by the BS 20, retransmits the data packet. Based on the above-mentioned retransmission mechanism, the data packet continues being uplink retransmitted till the BS 20 correctly receives the data packet, or transmission of the data packet is discarded after the retransmission times reaches the maximum value predetermined by the system.

Figure 5:
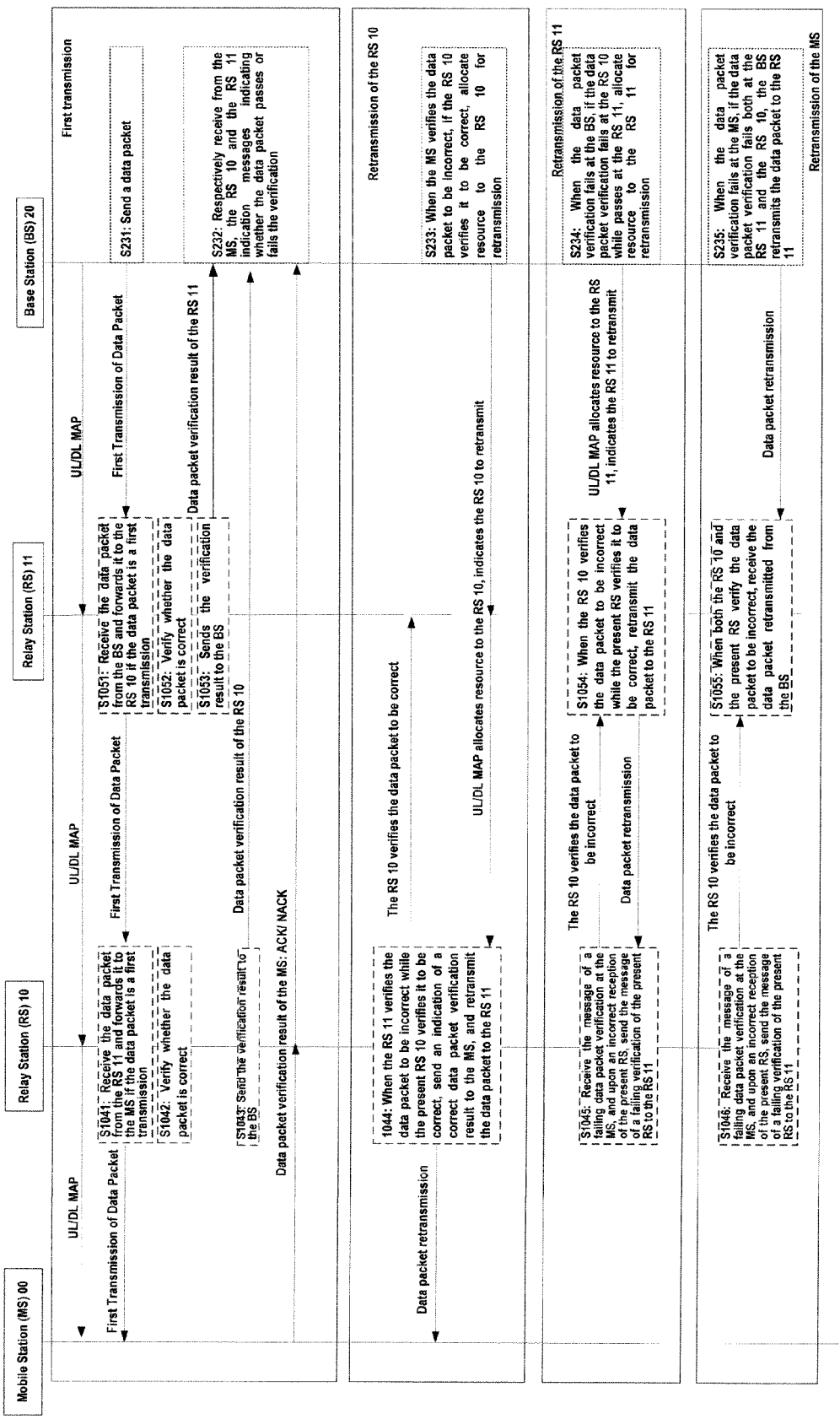
FIG. 5 is a flow diagram of an active Mobile Multi-hop Relaying (MMR) Hybrid Automatic Repeat reQuest (HARQ) method during downlink transmission of data packet in a three-hop relaying network topological structure of a wireless communication network according to one embodiment of the present invention.

FIG. 5 is a flow diagram of an active MMR HARQ method during downlink transmission of data packet in a three-hop relaying network topological structure of a wireless communication network according to one embodiment of the present invention.

As shown in FIG. 5, when the data packet is transmitted for the first time:

At step S231, the BS 20 sends a data packet to the RS 11.

At step S1051, the RS 11 receives the data packet from the BS 20 and directly forwards it to the RS 10. At step S1052, whether the data packet is correct is verified, and at step S1053, the verification result of the data packet is sent to the BS 20.

At step S1041, the RS 10 receives the data packet from the BS 11 and directly forwards it to the MS 00. At step S1042, whether the data packet is correct is verified, and at step S1043, the verification result of the data packet is sent to the BS 20.

The MS 00 verifies the data packets received from the RS 10 and sends the verification result to the BS 20 through the RS 10 and the RS 11.

At step S232, the BS 20 respectively receives indication messages indicating the data packet verification results from the RS 11, the RS 10 and the MS 00.

If the data packet of the MS 20 is verified correct, transmission of the data packet is complete. If the data packet verification fails at the MS 00, i.e. the MS 00 does not correctly receive the data packet, the BS 20 will allocate resource to the RS 11 or the RS 10 or the BS 20 per se for data packet retransmission, based on the data packet verification results of the RS 11 and the RS 10.

The BS 20 will allocate resource to the last RS in the transmission link where the data packet is verified correct. The skilled in the art would appreciate that in the data transmission link, as long as a data packet is verified correct at a RS, it is deemed that the data packet is correctly received, regardless of whether the data packet is correctly received at other RSs immediately preceding the RS in the transmission link.

Retransmission of the RS 10:

When the data packet verification fails at the MS 00 while the verification passes at the RS 10 (regardless of whether the verification passes at the RS 11), the BS 20, at step S233, allocates resource to the RS 10 such that the RS 10 performs data packet retransmission.

At step S1044, the RS 10, based on an indication message from the MS 00 indicating that the data packet verification fails at the MS and based on the successful data packet verification at the present RS, sends an indication message indicating that the present RS 10 correctly receives the data packet to the RS 11. And the data packet is retransmitted based on the resource allocated by the BS 20.

Similarly, in the follow-up processing (not shown in FIG. 5 for the sake of simplicity), when the MS 00 receives the data packet retransmitted from the RS 10, it verifies whether the data packet is correct and sends the verification result to the RS 10 and the BS 20. If the data packet is verified to be correct, its transmission is completed; and if the date packet is verified to be incorrect, the RS 11 continues retransmitting the data packet till the MS 00 correctly receives the data packet or transmission of the data packet is discarded when the retransmission times reaches the maximum value predetermined by the system.

Retransmission of the RS 11:

When the data packet verifications fail at the MS 00 and the RS 10 while the data packet verification passes at the RS 11, the RS 11 performs data packet retransmission.

At step S1045, the RS 10, based on an indication message from the MS 00 indicating that the data packet verification fails at the MS and based on the failing data packet verification result at the present RS, sends an indication message indicating that the data packet verification fails at the RS 10 to the RS 11.

At step S1054, the RS 11, according to the indication message from the RS 10 indicating the failing data packet verification result of the RS 10 and according to the successful data packet verification result in the present RS, retransmits the data packet to the RS 10 based on the resource allocated to the BS 20.

Similarly, in the follow-up processing (not shown in FIG. 5 for the sake of simplicity), after the RS 10 receives the data packet from the RS 11, it verifies whether the data packet is correct and sends the verification result to the BS 20 and the RS 11. If the verification fails, the RS 11 continues retransmitting the data packet till the RS 10 correctly receives the data packet or the transmission of the data packet is discarded after the retransmission times reaches the maximum value predetermined by the system. If the verification passes, the verified data packet is sent to the MS 00.

If the MS 00 receives correctly, the data packet transmission is completed. And if the MS 00 receives incorrectly, the RS 10 continues performing retransmission till the MS 00 correctly receives the data packet or the transmission of the data packet is discarded after the retransmission times reaches the maximum value predetermined by the system.

Retransmission of the BS 20:

At step S1046, the RS 10, based on an indication message received from the MS 00 indicating the failing data packet verification result of the MS 00 and based on the failing data packet verification result at the present RS, sends an indication message indicating that the data packet verification fails at the RS 10 to the RS 11.

When the data packet verification fails at the MS 00 and the data packet verifications also fail at the RS 11 and the RS 10, at step S235, the BS 20 retransmits the data packet to the RS 11.

The RS 11, at step S1055, according to the failing data packet verification result from the RS 10 and the failing data packet verification result of the present RS, receives the retransmitted data packet from the BS 20 based on the resource allocated to the BS 20.

Similarly, in the follow-up processing (not shown in FIG. 5 for the sake of simplicity), the RS 11 receives and verifies the retransmitted data packet, and reports the verification result to the BS 20. If the date packet is verified to be correct, the verified data packet is forwarded to the RS 10, otherwise, the BS 20 retransmits the data packet.

And then, the RS 10 receives and verifies the retransmitted data packet from the RS 11 the data packet, and reports the verification result to the BS 20 and the RS 11. If the data packet is verified to be correct, the verified data packet is forwarded to the MS 00, otherwise, the BS 20 allocates resource to the RS 11 for retransmission.

It should be noted that the active MMR HARQ solution of the present invention is not limited to the scenario under which only one or two RSs participate in HARQ between a BS and a MS. From the above description on FIGS. 2-5, the skilled in the art can readily deduce from analogy a scenario of three or more RSs participating in HARQ between a BS and a MS. And moreover, it should be understood that the flow diagrams of FIGS. 2-5 are not a sole and fixed form for the active MMR HARQ according to the embodiment of the present invention, and the skilled in the art may make various modifications to the processing flows of the above FIGS. 2-5 based on the prior art in the present field. For example, there modifications may be adjusting the sequences of the steps of the data packet verification and combining, receiving an indication message, and performing comparison and judgment based on various messages; or employing a special policy to reduce the retransmission delay in the follow-up processing procedure of the retransmission, etc.

Embodiment 2

Passive Mobile Multi-hop Relaying (MMR) HARQ

According to an embodiment of the present invention, the main characteristics of the passive MMR HARQ is: after a RS receives a data packet from an immediately preceding hop device, it directly forwards the data packet, instead of actively informing the immediately preceding hop device and the BS for controlling resource allocation of the verification result of the data packet. The RS only simply forwards data, wherein when the RS receives the retransmitted data packet, it will combine it with the previously received data packet. If the combined data packet is correct after CRC verification, the combined data packet is forwarded to the next hop device; otherwise, the received data packet is directly forwarded to the next hop device. Hereinafter, the procedure flow of the embodiment is described in detail with reference to FIG. 6 to FIG. 7.

Figure 6:
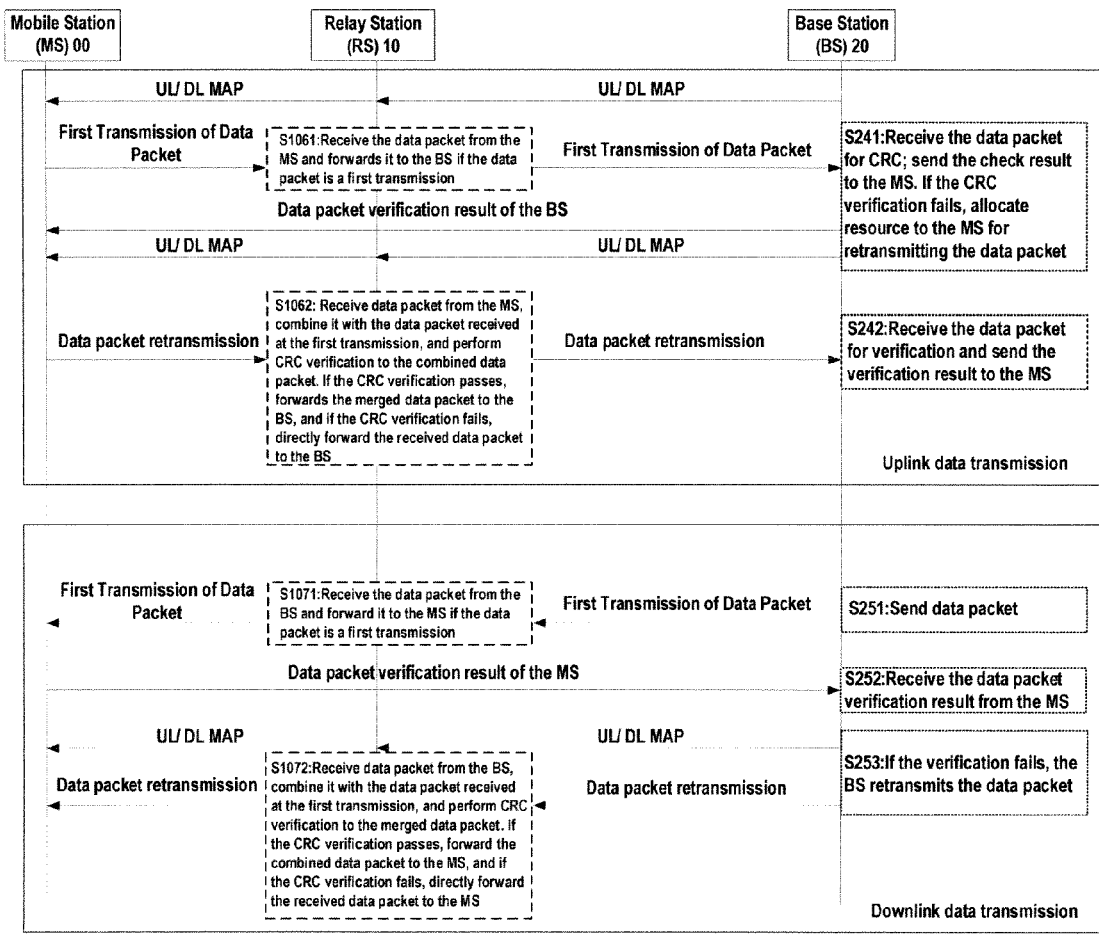
FIG. 6 is a flow diagram of a passive Mobile Multi-hop Relaying (MMR) Hybrid Automatic Repeat reQuest (HARQ) method during uplink and downlink transmissions of data packet in a two-hop relaying network topological structure of a wireless communication network according to one embodiment of the present invention.

FIG. 6 is a flow diagram of a passive MMR HARQ method during uplink and downlink transmissions of data packet in a two-hop relaying network topological structure of a wireless communication network according to one embodiment of the present invention.

As shown in FIG. 6, in the data packet uplink transmission:
The data packet is transmitted for the first time:
As shown in the figure, at step S1061, the RS 10 receives the data packet from the MS 00, and directly forwards it to the BS 20.

At step S241, the BS 20 receives and verifies the data packet from the RS 10 and sends the verification result to the MS 00. If the verification passes, the data packet transmission is completed. If the verification fails, resource is allocated to the MS 00 such that the MS 00 retransmits the data packet.

Retransmission at the MB 00:
The RS 10, at step S1062, receives data packet from the MS 00 and performs CRC verification after combining the data packet with that received at the first time. If the CRC verification is correct, the RS 20 forwards the combined correct data packet to the BS 20, and if the CRC verification is incorrect, it directly forwards the received data packet to the BS 20.

At step S242, the BS 20 receives and verifies the retransmitted data packet from the RS 10 and sends an indication message indicating the verification result to the MS 00. If the verification passes, transmission of the data packet is completed. If the verification fails, the procedure of MS 00 retransmission is repeated till the MS 00 correctly receives the data packet or transmission of the data packet is discarded when the retransmission times reaches the maximum value predetermined by the system.

As shown in FIG. 6, in the data packet downlink transmission:

For the first-time transmission:
At step S251, the BS 20 sends a data packet to the RS 10.
At step S1071, the RS 10 receives, based on the resource allocated by the BS 20, the data packet from the BS 20 and directly forwards it to the MS 00.

The MS 00 verifies the received data packet and sends the verification result to the BS 20.

At step S252, the BS 20 receives from the MS 00 an indication message indicating the data packet verification result of the MS 00. If the indication message indicates that the MS 00 correctly receives the data packet, transmission of the data packet is completed.

Retransmission of the BS 20:
If the MS 00 fails to correctly receive, at step S253, the BS 20 retransmits the data packet.

At step S1072, the RS 10 receives data packet from the BS 20 and performs CRC verification after combining the data packet with that received at the first time. If the CRC verification passes, the RS 10 forwards the combined correct data packet to the MS 00, and if the CRC verification fails, it directly forwards the received data packet to the MS 00.

If the MS 00 receives correctly, transmission of the data packet is completed. And if the MS 00 fails to receive correctly, the retransmission of the BS 20 continues being performed till the MS 00 correctly receives the data packet or the transmission of the data packet is discarded after the retransmission times reaches the maximum value predetermined by the system.

Figure 7:
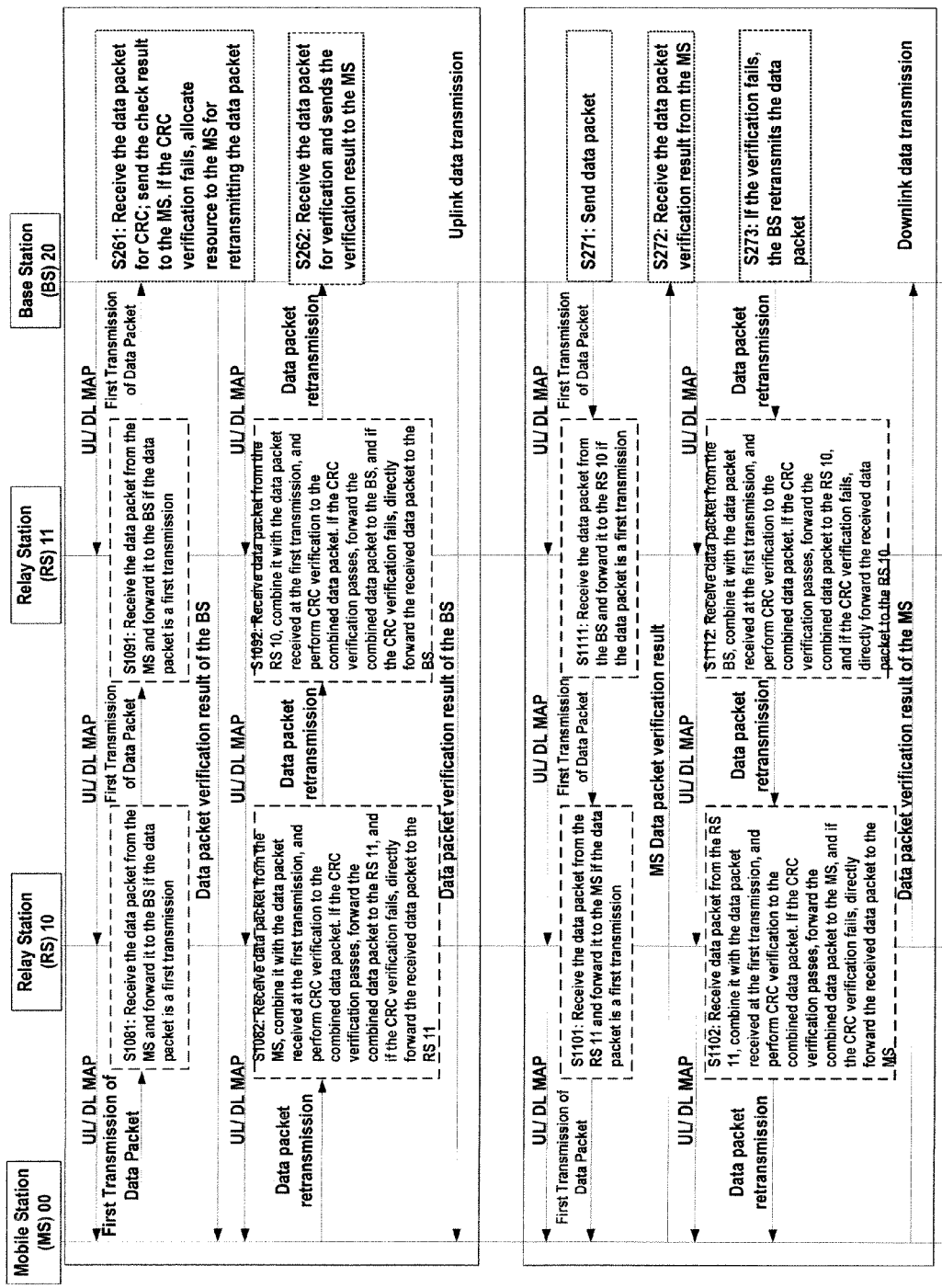
FIG. 7 is a flow diagram of a passive Mobile Multi-hop Relaying (MMR) Hybrid Automatic Repeat reQuest (HARQ) method during uplink and downlink transmissions of data packet in a three-hop relaying network topological structure of a wireless communication network according to one embodiment of the present invention.

FIG. 7 is a flow diagram of a passive MMR HARQ method during uplink and downlink transmissions of data packet in a three-hop relaying network topological structure of a wireless communication network according to one embodiment of the present invention.

As shown in FIG. 7, in the data packet uplink transmission:
For the first-time transmission:
At step S1081, the RS 10 receives the data packet from the MS 00, and directly forwards the data packet to the BS 11.

At step S1091, the RS 11 receives the data packet from the RS 10 and directly forwards the data packet to the BS 20.

At step S261, the BS 20 receives and verifies the data packet from the RS 11 and sends an indication message indicating the verification result to the MS 00. If the verification result is correct, transmission of the data packet is completed. If the verification fails, the BS 20 allocates resource to the MS 00 for retransmitting the data packet.

Retransmission of the MB 00:

At step S1082, the RS 10 receives data packet from the MS 00 and performs CRC verification after combining the data packet with that received at the first time. If the CRC verification passes, the RS 11 forwards the combined correct data packet to the BS 11, and if the CRC verification fails, it directly forwards the received data packet to the BS 20.

At step S1092, the RS 11 receives data packet from the RS 10 and performs CRC verification after combining the data packet with that received at the first time. If the CRC verification passes, the RS 20 forwards the combined correct data packet to the BS 20, and if the CRC verification fails, it directly forwards the received data packet to the BS 20.

At step S262, the BS 20 receives and verifies the data packet from the RS 11 and sends an indication message indicating the verification result to the MS 00. If the verification passes, transmission of the data packet is completed. If the verification fails, the retransmission procedure of the MS 00 is repeated till the MS 00 correctly receives the data packet or transmission of the data packet is discarded when the retransmission times reaches the maximum value predetermined by the system.

As shown in FIG. 7, in the data packet downlink transmission:

For the first-time transmission:

At step S271, the BS 20 sends a data packet to the RS 11.

At step S1111, the RS 11 receives, based on the resource allocated by the BS 20, the data packet from the BS 20 and directly forwards it to the RS 10.

At step S1101, the RS 10 receives, based on the resource allocated by the BS 20, the data packet from the RS 11 and directly forwards it to the MS 00.

The MS 00 verifies the received data packet and sends an indication message indicating the verification result to the BS 20.

At step S252, the BS 20 receives from the MS 00 an indication message indicating the data packet verification result of the MS 00. If the indication message indicates that the MS 00 correctly receives the data packet, transmission of the data packet is completed.

Retransmission of the BS 20:

If the MS 00 fails to correctly receive, the BS 20 retransmits the data packet.

At step S1112, the RS 11 receives data packet from the BS 20 and performs CRC verification after combining the data packet with that received at the first time. If the CRC verification passes, the RS 10 forwards the combined correct data packet to the RS 10, and if the CRC verification fails, it directly forwards the received data packet to the RS 10.

At step S1102, the RS 10 receives data packet from the RS 11 and performs CRC verification after combining the data packet with that received at the first time. If the CRC verification passes, the RS 10 forwards the combined correct data packet to the MS 00, and if the CRC verification fails, it directly forwards the received data packet to the MS 00.

If the MS 00 receives correctly, transmission of the data packet is completed. And if the MS 00 fails to receive correctly, the RS 20 continues performing retransmission till the MS 00 correctly receives the data packet or the transmission of the data packet is discarded after the retransmission times reaches the maximum value predetermined by the system.

From FIGS. 6 and 7, it would be appreciated that in the passive MMR HARQ solution of the embodiment of the present invention, the RS operation is simplified only to forward the data packet, not in charge of the message feedback in the HARQ. This passive MMR HARQ solution has an advantage of effectively reducing the device complexity and cost of the RS; but since the retransmission procedure can only start from a data transmission source (the MS for uplink transmission, and the BS for downlink transmission) and takes no consideration about the effect during the transmission procedure, it may cause waste to a limited network transmission resource in view of the active mobile multi-hop relaying (MMR) HARQ solution.

A further enhanced alternative solution for the passive MMR HARQ solution according to the present invention is characterized as follows: in the uplink transmission, when receiving an indication message from the BS that informs the MS of whether the data packet transmitted via the RS is correctly received, if the indication message indicates that the BS receives incorrectly, the RS checks whether the date packet it receives is correct, and if it is correct, converts the indication message that indicates that the BS receives incorrectly into an indication message that indicates that the BS receives correctly, and forwards the latter to the MS. Hereinafter, an embodiment of the method will be described in detail with reference to FIG. 8.

Figure 8:
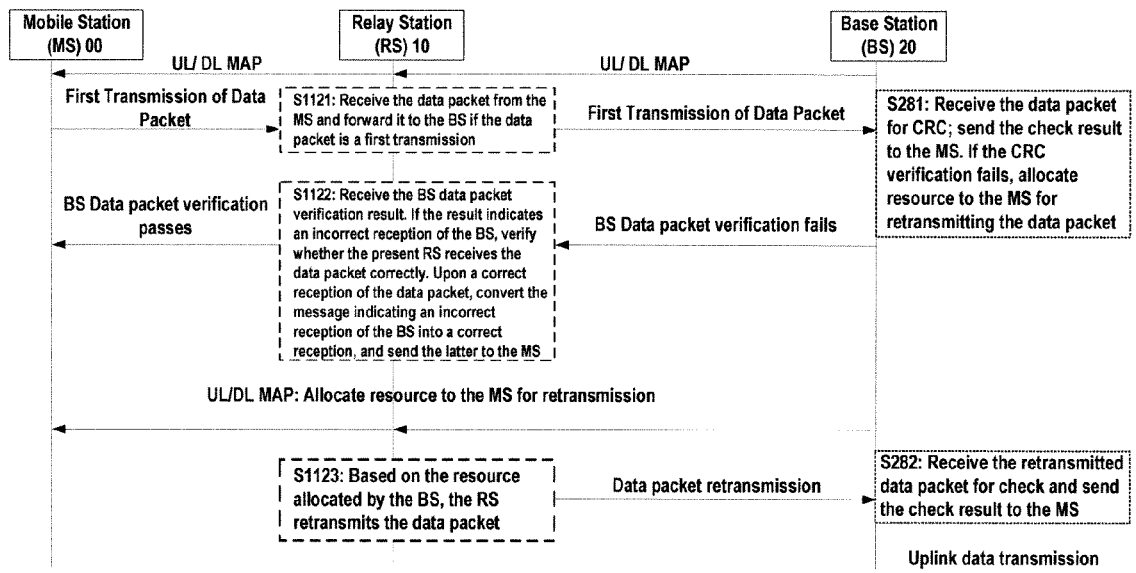
FIG. 8 is a flow diagram of an enhanced passive Mobile Multi-hop Relaying (MMR) Hybrid Automatic Repeat reQuest (HARQ) method during uplink transmission of data packet in a two-hop relaying network topological structure of a wireless communication network according to one embodiment of the present invention.

FIG. 8 is a flow diagram of an enhanced type passive MMR HARQ method during uplink transmission of data packet in a two-hop relaying network topological structure of a wireless communication network according to one embodiment of the present invention.

During the uplink transmission at step S1121, the RS 10 receives the data packet from the MS 00, and then directly forwards the data packet to the BS 20.

At step S281, the BS 20 receives and verifies the data packet from the RS 10 and sends the verification result to the MS 00 (via a RS). If the verification passes, transmission of the data packet is completed. If the verification fails, resource is allocated to the MS 00 such that the MS 00 retransmits the data packet.

At step S1122, the RS 10 receives from the BS an indication message indicating the data packet verification result of the BS. If the indication message indicates that the verification passes at the BS, the RS 10 forwards normally the indication message to the MS 00. If the indication message indicates that verification fails at the BS, the RS 10 judges whether the data packet verification passes at the present RS. If the data packet is verified to be correct at the present RS 10, the indication message indicating that verification fails at the BS is converted into an indication message indicating the successful data packet verification result at the BS, and then the latter is sent to the MS. In this way, the MS 00 deems that the BS 20 receives correctly and it is unnecessary to retransmit the data packet.

And then at step S1123, the RS 10, based on the resource allocated by the BS, retransmits the data packet stored in the RS 10 to the BS 20, till the BS 20 correctly receives the data packet or the transmission of the data packet is discarded after the retransmission times reaches the maximum value predetermined by the system.

To simplify the BS processing, in the downlink transmission of the data packet, the RS does not change the message from the MS and directly forwards it to the BS. The downlink transmission of the enhanced passive MMR HARQ solution according to an embodiment of the present invention is similar to the passive MMR HARQ, and the description thereof is thus omitted here.

Thus, the enhanced passive MMR HARQ solution according to an embodiment of the present invention, through introducing simple processing capability into the RS, optimizes the performance of the passive MMR HARQ, and thereby reduces transmission time delay and economizes network resource.

It should be noted that, the passive MMR HARQ solution and the enhanced passive MMR HARQ solution of the present invention are not limited to the scenario of one or two RSs participating HARQ between the BS and the MS. From the above description on FIGS. 6-8, the skilled in the art can readily deduce from analogy the scenario of more RSs participating in HARQ between the BS and the MS. And moreover, it should be understood that the flow diagrams of FIGS. 6-8 are not a sole and fixed form for the MMR HARQ according to the embodiment of the present invention, and the skilled in the art may make various modifications to the processing flows of the above FIGS. 6-8 based on the prior art in the present field.

Figure 9:
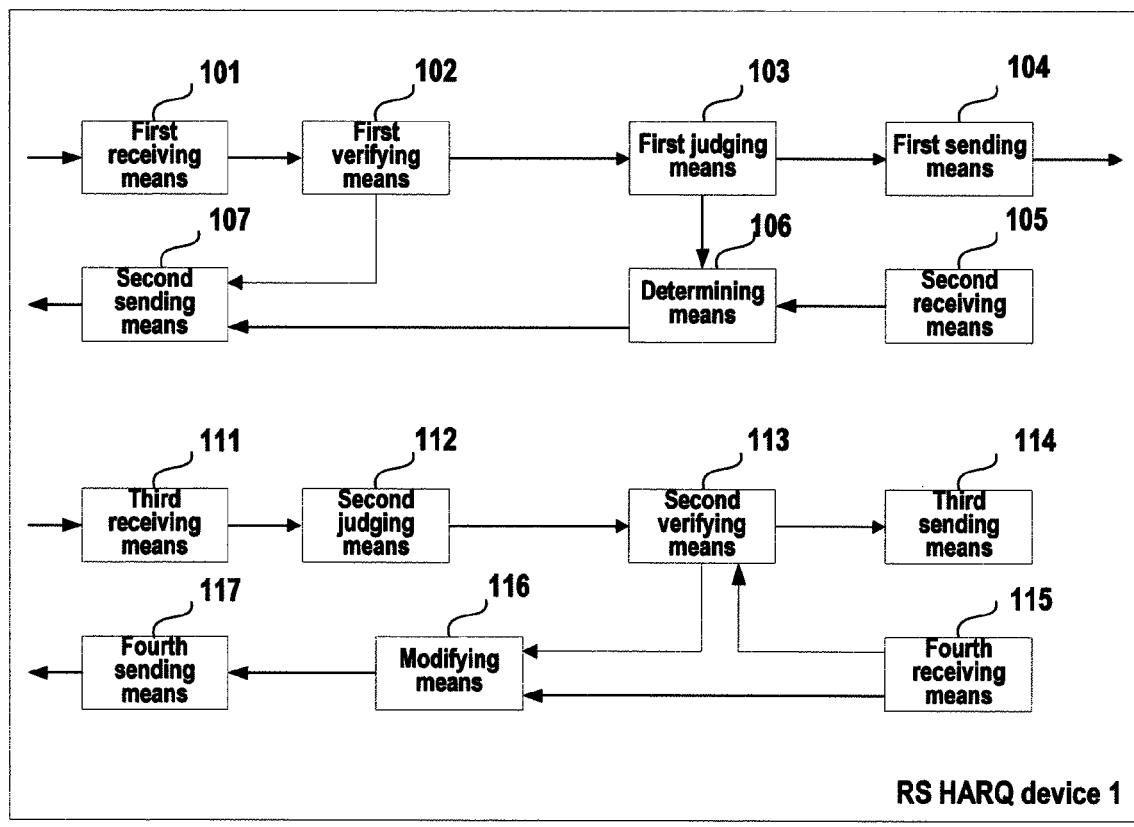
FIG. 9 is a block diagram of a device for Hybrid Automatic Repeat ReQuest (HARQ) in a relay station (RS) of a wireless communication network according to one embodiment of the present invention.

FIG. 9 is a block diagram 1 of a device for Hybrid Automatic Repeat ReQuest (HARQ) retransmission in a relay station (RS) of a wireless communication network according to one embodiment of the present invention. The block diagram 1 comprises first receiving means 101, first verifying means 102, first judging means 103, first sending means 104, second receiving means 105, determining means 106 and second sending means 107, which are used for an active HARQ; third receiving means 111, second Judging means 112, second verifying means 113, third sending means 114, fourth receiving means 115, modifying means 116 and fourth sending means 117, which are used for a passive HARQ.

The working procedure of the active HARQ in the RS is as follows:

Based on the resource allocated by the BS, the first receiving means 101 receives data packet from the immediately preceding hop device;

And then the first verifying means 102 verifies whether the data packet is correct so as to obtain a verifying result.

The second sending means 107, based on the resource allocated by the BS, sends an indication message indicating the verification result to the BS, such that the BS is enabled to allocate the resource for automatic retransmission based on the verification message.

The first judging means 103 judges whether the data packet is transmitted for the first time.

If yes, the first sending means 104 sends the data packet to the next hop device based on the resource allocated to the BS.

The second receiving means 105, based on the resource allocated by the BS, receives from the next hop device an indication message indicating whether the next hop device correctly receives the data packet.

The determining means 106, based on the indication message from the next hop device, determines to send the message indicating whether the present RS receives correctly to the immediately preceding hop device. When the second receiving means 105 receives the indication message from the next hop device indicating the next hop device receives correctly, and determines that, based on the resource allocated by the base station, the second sending means 107 sends an indication message indicating that the present RS receives the data packet correctly to the immediately preceding hop device; when the second receiving means 105 receives from the next hop device an indication message indicating that the next hop device receives incorrectly, it is determined that the second sending means 107 sends an indication message indicating the data packet verification result at the present RS to the immediately preceding hop device.

When the next hop device verifies the data packet to be incorrect while the present RS verifies the data packet to be correct, based on the resource allocated by the BS, the first sending means 104 retransmits the data packet to the next hop device, wherein during the uplink data packet retransmission, since the present RS receives correctly, the immediately preceding hop needs no retransmission of the data packet, and thus the BS may allocate the idle resources to the present RS to transmit one or more data packets including identical effect data information, while redundancy information of such data packets may be different. After the next hop device of the RS combines the received plurality of data packets, a combined data packet is obtained, and afterwards, an operation identical to that for a single received data packet is performed. Here, the limitation to uplink transmission of data packet is for simplifying the MS processing. If the MS is configured to support receiving a plurality of data packets and combining them, it is likewise capable of sending a plurality of data packets in the data packet downlink transmission.

Thus, the first sending means 104, based on the resource allocated by the BS, sends the plurality of identical data packets within the same frame.

When the data packet is a retransmitted one, the first verifying means 102 verifies the data packet, and the second sending means 107 is also employed for, based on the resource allocated by the BS, sending the verification result of the first verifying means to the BS and the immediately preceding hop device, such that the immediately preceding device retransmits the data packet based on the resource allocated by the BS.

When the first verifying means 102 verifies the data packet to be correct, the first sending means 104 forwards the combined data packet that is verified to be correct to the next hop device.

The working procedure of the passive HARQ in the relay station is as follows:

In the passive HARQ, the third receiving means 111, based on the resource allocated by the BS, receives the data packet from the next hop device.

The second judging means 112 judges whether the data packet is a retransmitted data packet.

If the data packet is a retransmitted one, the second verifying means 113 verifies whether the data packet is correct.

When the second verifying means 113 verifies the data packet to be correct, the third sending means 114 forwards the combined data packet that is verified to be correct to the next hop device; otherwise, it directly forwards the received data packet to the next hop device.

When the data packet is transmitted for the first time, the third sending means 114 directly forwards the data packet to the next hop device.

The fourth receiving means 115, based on the resource allocated by the BS, receives from the BS an indication message informing the MS of indicating whether the data packet transmitted via the present RS and received by the BS is correct.

When the fourth receiving means 115 receives an indication message that indicates the BS fails to correctly receive the data packet transmitted via the present RS, the second verifying means 113 verifies whether the RS correctly receives the data packet.

When the second verifying means 113 verifies that the present RS correctly receives the data packet, the modifying means 116 converts the indication message from the BS for informing the MS of indicating that the BS receives the data packet incorrectly into an indication message that indicates a correct reception, so as to obtain an indication message that indicates the BS receives correctly.

And then, the fourth sending means 117, based on the resource allocated by the BS, forwards the message indicating that the BS receives correctly to the immediately preceding hop device.

Here, it should be noted that, the resource allocated by the BS is a channel allocated by the BS, and both the immediately preceding hop device and the next hop device include a MS, a RS and a BS.

Figure 10:
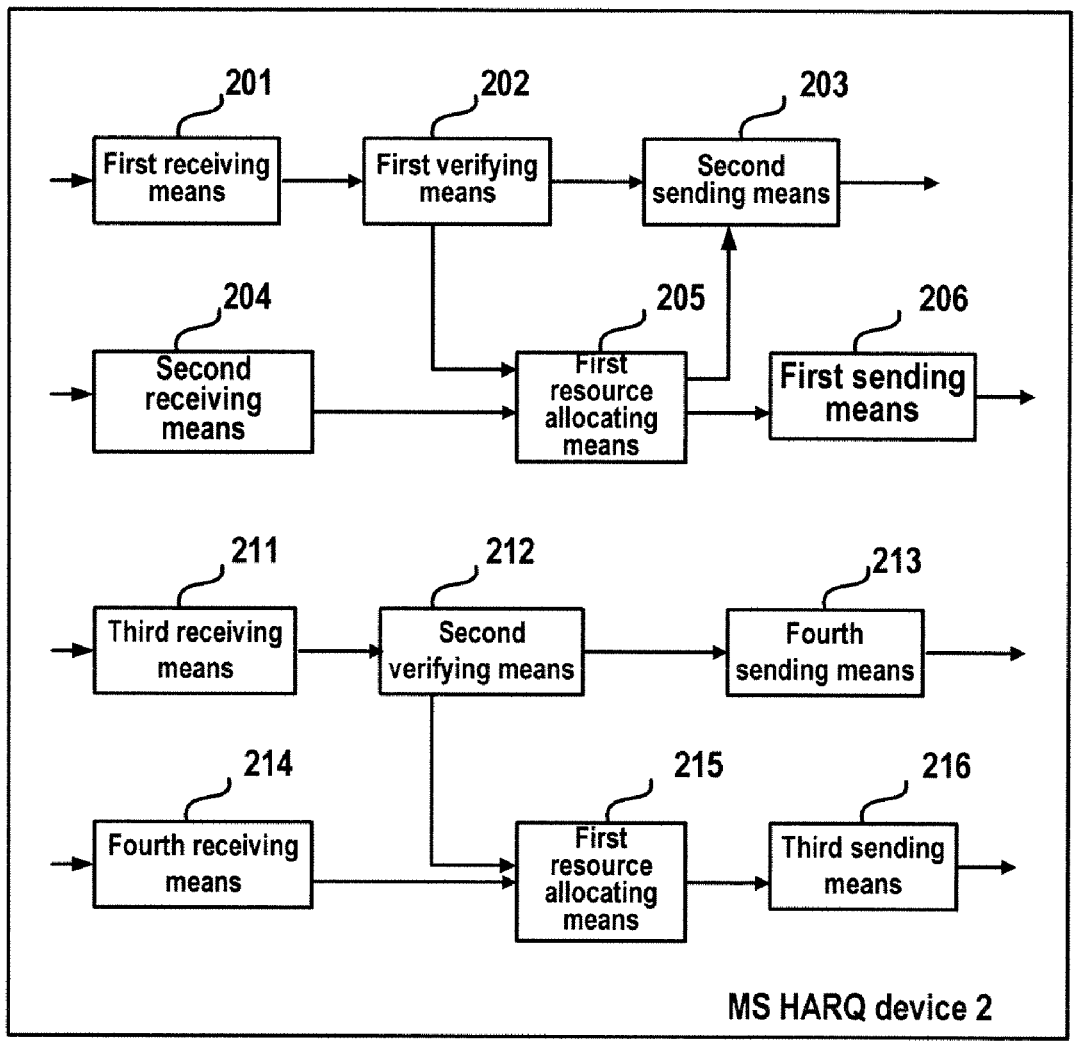
FIG. 10 is a block diagram of a device for Hybrid Automatic Repeat ReQuest (HARQ) in a base station (BS) of a wireless communication network according to one embodiment of the present invention.

FIG. 10 is a block diagram 2 of a device for Hybrid Automatic Repeat ReQuest (HARQ) in a base station (BS) 20 of a wireless communication network according to one embodiment of the present invention. The block diagram 2 comprises first receiving means 201, first verifying means 202, second sending means 203, second receiving means 204, first resource allocating means 205, and first sending means 206, which are used for an active HARQ; and third receiving means 211, second verifying means 212, fourth sending means 213, fourth receiving means 214, first resource allocating means 215, and third sending means 216, which are used for a passive HARQ.

The working procedure of the active HARQ in the BS is as follows:

Uplink transmission of data packet:

The first receiving means 201 receives from the MS a data packet transmitted via one or more RSs.

And meanwhile, the second receiving means 204 receives from the one or more RSs an indication message indicating whether the RSs correctly receives the data packet.

The first verifying means 202 verifies whether the data packet is correct so as to obtain a verifying result.

The second sending means 203 sends the verifying result to the previous hop of the present BS.

When the verification fails, the first resource allocating means 205, based on the indication message(s) from one or more RSs, allocates resource to the data packet for retransmission.

When the BS verifies the data packet to be incorrect and in the indication messages received by the second receiving means 204 from one or more RSs, at least one indication message indicates that a RS correctly receives the data packet, the first resource allocation means 205 allocates resource to the RS which correctly receives the data packet, as the RS of the hop device closest to the BS, for retransmitting the data packet; otherwise, the resource is allocated to the MS for retransmitting the data packet.

When retransmitting the data packet, the second receiving means 204 is also for receiving from the one or more RSs indication messages indicating whether the RSs receives correctly the data packet. When in the indication message s received by the second receiving means from the one or more RSs, there is an indication message that indicates a RS receives incorrectly the data packet, the first resource allocation means 205 allocates resource to the immediately preceding hop device of the RS which receives incorrectly, for retransmitting the data packet.

Downlink transmission of data packet:

For the first-time transmission:

The first sending means 206 firstly sends a data packet to the MS via one or more RSs.

The second receiving means 204 receives indication messages respectively from the MS and one or more RSs, which messages are for indicating whether the MS or RS correctly receives data packet from the immediately preceding hop device;

When the indication message received by the second receiving means 204 from the MS indicates that the MS receives incorrectly the data packet from the immediately preceding hop device, the first resource allocating means 205 allocates resource to the data packet for retransmission, wherein when in the indication messages received by the second receiving means 204 from one or more RSs, there is at least one indication message indicating that a RS correctly receives the data packet from the immediately preceding hop device, the first resource allocating means 205 allocates resource to the RS which correctly receives the data packet, as the RS in the hop device closest to the MS, for retransmitting the data packet; Otherwise, the BS per se retransmits the data packet.

When retransmitting the data packet:

The second receiving means 204 receives indication messages respectively from one or more RSs, which messages are for indicating whether the RSs correctly receive data packet from the immediately preceding hop device;

When in the indication messages received by the second receiving means 204 from the one or more RSs, there is an indication message that indicates a RS receives incorrectly the data packet from the immediately preceding hop device, the first resource allocation means 205 allocates resource to the immediately preceding hop device of the RS which receives incorrectly, for retransmitting the data packet.

Working procedure of the passive HARQ in the BS is as follows:

When the data packet is uplink transmitted:

The third receiving means 211 receives from the MS a data packet transmitted via one or more RSs.

The second verifying means 212 verifies whether the data packet is correct so as to obtain a verifying result.

The fourth sending means 213 sends an indication message comprising the verifying result to the MS.

When the second verifying means 212 verifies the data packet to be incorrect, the second resource allocating means 215 allocates resource to the MS for retransmitting the data packet.

When the data packet is downlink transmitted:

The first sending means 216 sends a data packet to the MS via one or more RSs.

The fourth receiving means 214 receives from the MS an indication message sent via one or more RSs, which message is for indicating whether the MS correctly receives the data packet.

When the indication message received by the fourth receiving means 214 from the MS indicates that the MS receives the data packet incorrectly, the third sending means 216 retransmits the data packet.

Here, it should be noted that, the resource allocated by the BS is a channel allocated by the BS, and both the immediately preceding hop device and the next hop device may be an MS, a RS and a BS.

FIGS. 9 and 10 respectively show devices in the RS and BS, which implement two HARQ mechanisms of the present invention, i.e. the active HARQ, and the passive HARQ. The RSs and BS may be separately configured as an active HARQ mode or as a passive HARQ mode, which depends on the actual communication demands.

The various device modules shown in FIGS. 9 and 10 may be implemented by hardware, software or combination of both. The skilled in the art may, based on the functions implemented by the various device modules or their other properties, combine or further split them. The skilled in the art may add any other device modules on the basis of FIGS. 9 and 10 according to the prior art, so as to realize expected additional functions.

It should be understood that the above embodiments of the present invention are only current preferred solutions, with a purpose to provide a transparent HARQ procedure for the prior art MS, thus each embodiment described here does not relate to any improvement to the MS. However, the present invention is not limited to this transparent implementation method for the MS. The skilled in the art may construct other embodiments of the present invention by correspondingly improving the MS, for example, adding a new intelligent processing flow.

The preferred embodiments of the present invention are described above. It should be understood that the present invention is not limited to the above special embodiments, and the skilled in the may make various alterations or modifications within the scope of the appended claims.

What is claimed is:

1. A method for a Hybrid Automatic Repeat reQuest (HARQ) in a relay station (RS) of a wireless communication network, wherein a HARQ process is implemented based on resources allocated by a base station (BS) comprising:
   a. receiving a data packet from an immediately preceding hop device on resource allocated by said base station;
   b. verifying whether said data packet is correct, so as to obtain a verification result; and,
   c. sending to said BS an indication message indicating said verification result such that said BS is capable of allocating said resource of automatic retransmission based on said indication message.

2. A method according to claim 1, further comprising:
   e1. sending the data packet to a next hop device based on the resource allocated by said BS, if the received data packet is transmitted for the first time;
   f1. receiving, based on the resource allocated by said BS, from the next hop device an indication message indicating whether the next hop device correctly receives said data packet; and
   g1. determining an indication message sent to said next hop device and indicating correct reception of said RS, based on said indication message from the next hop device.

3. A method according to claim 2, wherein said element g1 further comprises:
   sending, when said indication message from said next hop device indicates that said next hop device correctly receives said data packet, an indication message indicating said RS correctly receives said data packet to said next hop device on resource allocated by said BS; and
   sending, when said indication message from the next hop device indicates that the next hop device receives incorrectly said data packet, an indication message indicating verification result of said data packet in said RS to said immediately preceding hop device.

4. A method according to claim 2, further comprising:
   h1. retransmitting, when the indication message from said next hop device indicating that the next hop device receives said data packet incorrectly and said verification result passes, said data packet to said next hop device based on the resource allocated by said BS.

5. A method according to claim 4, wherein, transmitting, during uplink retransmission of a data packet, a plurality of said data packets that are identical within a same frame based on resource allocated by said BS, said plurality of identical data packets including identical effective data information.

6. A method according to claim 1, further comprising:
   e2. if said data packet is a retransmitted data packet, sending said indication message indicating said verification result to said immediately preceding hop device on resource allocated by said BS, such that said immediately preceding hop device retransmits said data packet based on the resource allocated by said BS; and
   f2. if said verification result passes, forwarding said data packet that is verified correct to said next hop device based on the resource allocated by said BS.

7. A method according to claim 1, wherein the resource allocated by said BS is an uplink transmission channel or a downlink transmission channel.

8. A method according to claim 1, wherein said immediately preceding hop device or said next hop device may be any one of a MS, a RS or a BS.

9. A method for a Hybrid Automatic Repeat reQuest (HARQ) in a relay station (RS) of a wireless communication network, wherein a HARQ process is implemented based on resources allocated by a base station (BS) comprising:
   receiving, based on resource allocated by said BS, a data packet from an immediately preceding hop device;
   sending based on the resource allocated by said BS, the data packet directly to said next hop device, if the received data packet is transmitted for the first time; and
   verifying, if said data packet is a retransmitted one, whether said data packet is correct so as to obtain a verifying result based on which the manner of forwarding said data packet to said next hop device is determined.

10. A method according to claim 9, wherein said verifying is implemented by combining said retransmitted data packet with that received previously during one or more times of transmission and verifying said combined data packet, and
    if said verification passes, forwarding, based on resource allocated by said BS, said combined data packet to said next hop device; and
    if said verification fails, forwarding, based on resource allocated by said BS, said data packet to said next hop device.

11. A method according to claim 9, uplink transmission of data packet further comprising:
    receiving, based on the resource allocated by said BS, an indication message from said BS for informing a mobile station (MS) of indicating whether the data packet received by said BS is correct;
    converting, if said indication message indicates that said BS fails to correctly receive said data packet and if said verification fails, said indication message indicating that said BS fails to correctly receive said data packet into an indication message indicating that said BS correctly receives said data packet;
    forwarding, based on the resource allocated by said BS, said converted indication message indicating that said BS correctly receives said data packet to said immediately preceding hop device; and
    retransmitting, based on the resource allocated by said BS, the data packet that is verified correct to said next hop device.

12. A device for a Hybrid Automatic Repeat reQuest (HARQ) in a relay station (RS) of a wireless communication network, wherein a HARQ process is implemented based on a resource allocated by a base station (BS), comprising:
    first receiving means for receiving, based on the resource allocated by the base station, a data packet from an immediately preceding hop device;
    verifying means for verifying whether said data packet is correct so as to obtain a verification result; and
    second sending means for sending, based on the resource allocated by said BS, an indicating message indicating said verification result to said BS, such that said BS is enabled to allocate the resource for automatic retransmission based on the indicating message.

13. A device according to claim 12, further comprises:
    first judging means for judging whether said received data packet is transmitted for the first time;

first sending means for sending said data packet to a next hop device based on the resource allocated by said BS, if said received data packet is transmitted for the first time;

second receiving means for receiving, based on the resource allocated by the BS, from said next hop device an indicating message indicating whether said next hop device correctly receives said data packet; and determining means for determining an indication message sent to said next hop device and indicating whether said RS receives correctly, based on said indication message from the next hop device, wherein said second sending means is also for sending to said immediately preceding hop device an indication message indicating whether said RS receives correctly.

14. A device according claim 13, wherein said determining means is also for:

determining, when said second receiving means receives said indication message from said next hop device indicating that said next hop device correctly receives said data packet, that said second sending means sends, based on the resource allocated by said BS, an indication message indicating that said RS correctly receives the data packet to said immediately next hop device;

determining, when said second receiving means receives said indication message from said next hop device indicating said next hop device receives incorrectly, that said second sending means sends an indication message indicating a data packet verification result in the RS to said next hop device.

15. A device according claim 13, wherein said first sending means is also for:

when the indication message from said next hop device indicating that the next hop device receives said data packet incorrectly and said verification result passes, retransmitting, on resource allocated by said BS, said data packet to said next hop device.

16. A device according claim 15, wherein said first sending means is also for:

during uplink retransmission of a data packet, sending a plurality of said data packets that are identical within a same frame based on the resource allocated by said BS, said plurality of identical data packets including identical effective data information.

17. A device according to claim 13, wherein:

said second sending means is also for:

if said data packet is a retransmitted one, sending, based on the resource allocated by said BS, an indication message indicating said verification result of said first verifying means to said immediately preceding hop device, such that said immediately preceding hop device retransmits said data packet based on the resource allocated by said BS;

and said first sending means is also for:

if the verification result of said first verifying means passes, forwarding, based on the resource allocated by said BS, said data packet that is verified correct to said next hop device.

18. A device according to claim 12, wherein the resource allocated by said BS is an uplink transmission channel or a downlink transmission channel.

19. A device according to claim 12, wherein said immediately preceding hop device or said next hop device may be any one of a MS, a RS or a BS.

20. A device for a Hybrid Automatic Repeat reQuest (HARQ) in a relay station (RS) of a wireless communication network, wherein a HARQ process is implemented based on a resource allocated by a base station (BS), comprising:

third receiving means for receiving, based on the resource allocated by the BS, a data packet from an immediately preceding hop device;

second judging means for judging whether said received data packet is transmitted for the first time;

second verifying means for verifying whether said data packet is correct so as to obtain a verification result when said second judging means judges that said data packet is a retransmitted one; and third sending means for directly forwarding, when said second judging means judges that said data packet is a first transmission, said data packet to said next hop device based on the resource allocated by said BS; and determining, when said second judging means judges that said data packet is a retransmitted one, a manner of forwarding said data packet to said next hop device based on the verifying result of said second verifying means.

21. A device according to claim 20, wherein said second verifying means implements said verification by combining said retransmitted data packet with that received previously during one or more times of transmission and verifying said combined data packet, and wherein said third sending means is for:

if said verification result passes, forwarding, based on resource allocated by said BS, said combined data packet to said next hop device; and if said verification fails, forwarding, based on resource allocated by said BS, said data packet to said next hop device.

22. A device according to claim 20, further comprising:

fourth receiving means for receiving, based on the resource allocated by said BS, an indication message from said BS for informing a mobile station (MS) of indicating whether the data packet received by said BS is correct;

modifying means for converting, if said indication message indicates that said BS fails to correctly receive said data packet and if said verification result of said second verifying means passes, said indication message indicating that said BS fails to correctly receive said data packet into an indication message indicating that said BS correctly receives said data packet;

fourth sending means for forwarding, based on the resource allocated by said BS, said converted indication message indicating that said BS correctly receives said data packet to said immediately preceding hop device; and said third sending means is also for retransmitting a data packet verified to be correct to said next hop device based on the resource allocated by said BS.

23. A method for Hybrid Automatic Repeat reQuest (HARQ) in a base station (BS) of a wireless communication network, wherein the HARQ process is implemented in-between one or more RSs and a mobile station (MS) based on a resource allocated by said BS comprising:

i. receiving from said one or more RSs an indication message indicating whether the RSs correctly receive the data packet; and ii. determining how to implement retransmission of said data packet and allocating a corresponding resource applied for implementing retransmission based on said indication messages from one or more RSs.

24. A method according to claim 23, wherein in uplink transmission of data packet, if the current transmission is a first transmission of said data packet, said method further comprises:

receiving a data packet transmitted from said MS via said one or more RSs;

verifying whether said received data packet is correct so as to obtain a verification result;

sending an indication message indicating said verification result to an immediately preceding hop device of said BS; and if said verification result fails, said element ii comprises:

allocating, if in said indication messages from one or more RSs, there is at least one indication message indicating that a respective RS correctly receives said data packet, resource for implementing retransmission to said RS which correctly receives the data packet, as the RS of the hop device closest to the BS; otherwise, allocating the resource for implementing retransmission to said MS.

25. A method according to claim 23, wherein in uplink transmission of data packet, if the current transmission is a first transmission of said data packet, said element ii of said method further comprises:

allocating, if in said indication messages from one or more RSs, there is an indication message indicating that a RS incorrectly receives said data packet, resource for implementing retransmission to the immediately preceding device of said RS that receives incorrectly.

26. A method according to claim 23, wherein in downlink transmission of data packet, if the current transmission is a first transmission of said data packet, said method further comprises:

sending a data packet to said MS via said one or more RSs;

receiving from said MS a message indicating whether said MS correctly receives the data packet;

if said indication message indicates that said MS incorrectly receives said data packet, said element ii comprises:

if in said indication messages from one or more relay RSs, there is at least one indication message indicating that a RS correctly receives said data packet from the immediately preceding hop device, allocating resource for implementing retransmission to said RS which correctly receives the data packet and is the closest hop device to the BS; otherwise, allocating the resource for implementing retransmission to said BS per se.

27. A method according to claim 23, wherein in downlink transmission of data packet, if the current transmission is a first transmission of said data packet, said element ii of said method further comprises:

allocating, if in said indication messages from one or more RSs, there is an indication message indicating that a RS incorrectly receives said data packet from the immediately preceding hop device, resource for implementing retransmission to the immediately preceding device of said RS that receives incorrectly.

28. A method according to claim 23, wherein in the uplink transmission of data packet, said method further comprises:

receiving a data packet transmitted from said MS via said one or more RSs;

verifying whether said data packet is correct so as to obtain a verification result;

sending an indication message indicating said verification result to said MS; and allocating, if said verification result fails, resource for implementing retransmission to said MS.

29. A method according to claim 23, wherein in the downlink transmission of data packet, said method further comprises:

sending a data packet to said MS via said one or more RSs;

receiving an indication message from said MS via said one or more RSs, said indication message being for indicating whether said MS correctly receives said data packet; and allocating, if said indication message indicates that said MS incorrectly receives said data pocket, resource for implementing retransmission to said BS per se.

30. A method according to claim 23, wherein said immediately preceding hop device or said next hop device may be any one of a MS, a RS or a BS.

31. A device for Hybrid Automatic Repeat reQuest (HARQ) in a base station (BS) of a wireless communication network, wherein the HARQ process is implemented in-between one or more RSs and a mobile station (MS) based on a resource allocated by said BS, comprising:

second receiving means for receiving from said one or more RSs an indication message indicating whether the RSs correctly receives the data packet;

first resource allocating means for determining how to implement retransmission of said data packet and allocating a corresponding resource applied for implementing retransmission based on said indication messages from one or more RSs.

32. A device according to claim 31, comprises:

first receiving means for receiving from said MS a data packet transmitted via one or more RSs;

first verifying means for verifying whether said data packet is correct so as to obtain a verification result;

second sending means for sending an indication message indicating said verification result to an immediately hop device preceding to said BS, and in uplink transmission of data packet, if a current transmission is a first transmission of said data packet, said first resource allocation means is further for:

when the BS verifies the data packet to be incorrect and in the indication messages received by the second receiving means from one or more relay RSs, at least one indication message indicates that a RS correctly receives the data packet, allocating resource for implementing retransmission to the RS which correctly receives the data packet and is the RS of the closest hop device to the BS; otherwise, allocating said resource for implementing retransmission to the MS.

33. A device according to claim 31, wherein, in uplink transmission of data packet, if a current transmission is a retransmission of said data packet, said first resource allocating means is further for:

if in said indication messages from one or more RSs, there is an indication message indicating that a RS incorrectly receives said data packet, allocating resource for implementing retransmission to the immediately preceding device of said RS that receives incorrectly.

34. A device according to claim 31, comprising:

first sending means for sending a data packet to said MS via one or more RSs, wherein said second receiving means is further for:

receiving from said MS a message indicating whether said MS correctly receives the data packet, and in downlink transmission of data packet, if a current transmission is a first transmission of said data packet, said first resource allocation means is further for:

when said indication messages indicate said MS incorrectly receives said data packet, if in said indication messages from said one or more RSs, there is at least one indication message that indicates a RS correctly receives said data packet from an immediately preceding hop, allocating resource for implementing retransmission to said RS which correctly receives the data packet and is the RS of the closest hop device to the BS; otherwise, allocating the resource for implementing retransmission to said BS per se.

35. A device according to claim 31, comprising:

in downlink transmission of data packet, if a current transmission is a retransmission of said data packet, said first resource allocation means is further for:

allocating, if in said indication messages from one or more RSs there is an indication message indicating that a RS incorrectly receives said data packet from the immediately preceding hop device, resource for implementing retransmission to the immediately preceding device of said RS that receives incorrectly.

36. A device according to claim 31, wherein said immediately preceding hop device or said next hop device may be any one of a MS, a RS or a BS.

37. A device for Hybrid Automatic Repeat reQuest (HARQ) in a base station (BS) of a wireless communication network, wherein the HARQ process is implemented in-between one or more RSs and a mobile station (MS) based on a resource allocated by said BS, comprising:

third receiving means for receiving from said MS a data packet transmitted via one or more RSs;

second verifying means for verifying whether said data packet is correct so as to obtain a verifying result;

fourth sending means for sending an indication message indicating said verification result to said MS;

second resource allocating means for allocating resource for implementing retransmission to said MS when verification result of the second verifying means fails.

38. A device for Hybrid Automatic Repeat reQuest (HARQ) in a base station (BS) of a wireless communication network, wherein the HARQ process is implemented in-between one or more RSs and a mobile station (MS) based on a resource allocated by said BS, comprising:

third sending means for sending a data packet to said MS via said one or more RSs;

fourth receiving means for receiving an indication message from said MS via said one or more RSs, said indication message being for indicating whether said MS correctly receives said data packet;

data packet retransmitting means for allocating resource for implementing retransmission when said indication message received by the fourth receiving means indicates that said MS incorrectly receives said data packet.

* * * * *